United States Patent
Nguyen (10) Patent No.: US 7,016,800 B1
(45) Date of Patent: Mar. 21, 2006

(54) CENTRALIZED CONSOLE API TESTING ARCHITECTURE

(75) Inventor: HongLien Nguyen, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 86 days.

(21) Appl. No.: 10/738,312

(22) Filed: Dec. 16, 2003

(51) Int. Cl.
*G06F 15/00* (2006.01)
*G06F 15/77* (2006.01)

(52) U.S. Cl. .................... 702/108; 702/182; 709/220; 709/223; 717/131

(58) Field of Classification Search ............ 702/108, 702/119, 123, 182; 707/8, 10, 202; 709/220, 709/224; 717/124, 131
See application file for complete search history.

(56) References Cited

U.S. PATENT DOCUMENTS

| 6,035,264 A | * | 3/2000 | Donaldson et al. | ......... 702/182 |
| 6,219,829 B1 | * | 4/2001 | Sivakumar et al. | ......... 717/131 |
| 6,804,709 B1 | * | 10/2004 | Manjure et al. | ............ 709/220 |

* cited by examiner

*Primary Examiner*—Michael Nghiem
*Assistant Examiner*—John Le
(74) *Attorney, Agent, or Firm*—Martine Penilla & Gencarella, LLP (57) ABSTRACT

A method for API testing is provided that includes attaching a top level header to an API request from a console where the top level header facilitates processing of the API request by a host driver. The method also includes forwarding the API request with the top level header to the host driver and receiving an API response from the host driver where the API response includes the top level header. The method also includes removing the top level header from the API response so the console can process the API response.

20 Claims, 8 Drawing Sheets

| Bit Byte | 7 | 6 | 5 | 4 | 3 | 2 | 1 | 0 |
|---|---|---|---|---|---|---|---|---|
| 0-3 | across: Agent Header Length ||||||||
| 4-7 | Agent Payload Length ||||||||
| 8-9 | Agent Min Version ||||||||
| 10-11 | Agent Max Version ||||||||
| 12-15 | Agent API Type ||||||||
| 16-19 | Agent API Tag ||||||||
| 20-23 | Agent API Status ||||||||
| 24-31 | Reserved ||||||||

FIG. 7

CENTRALIZED CONSOLE API TESTING ARCHITECTURE

INCORPORATION BY REFERENCE

A computer program listing on a CD-ROM is hereby incorporated as reference. The CD-ROM contains an ASCII file entitled "Computer Program Listing Appendix." The ASCII file is one embodiment of a code that utilizes a methodology described herein. However, the one embodiment is one of many different embodiments of code that can accomplish the methodology.

BACKGROUND OF THE INVENTION

1. Field of the Invention

This invention relates generally to computing technology and more particularly concerns the testing of Application Programming Interfaces (APIs)

2. Description of the Related Art

Developing tests for API testing of a complex system is by itself a formidable task. This task is further compounded by the requirement for the API test suite to support many different operating systems. Typically, separate test suites need to be maintained for each operating system tested. In addition, separate test development environments are needed for each operating system under which tests need to be created. Also, the porting task for moving the complex test engine and user interface between the operating systems is a significant development task.

Figure 1A:
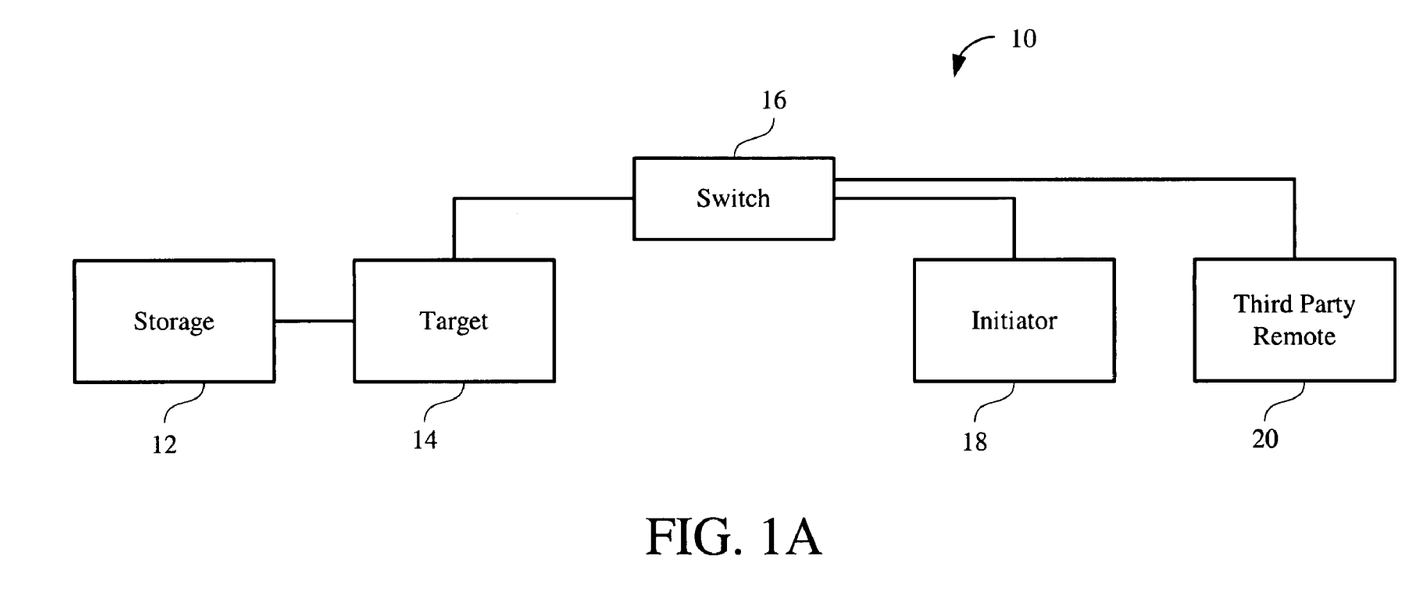
FIG. 1A shows a typical API testing system.

FIG. 1A shows a typical API testing system. In one example, the API testing system includes a storage 12 connected to a target 14 that is interconnected with both an initiator 18 and a third party remote 20 through a switch 16. The initiator 18 typically communicates with the target 14 which has the storage 12 associated with it. The switch 16 is generally a network device, such as a router or bridge. Third party companies generally need to manage initiators remotely through the third party remote 20 that uses their own third party graphic user interface (GUI). The API usually is defined by the maker of the initiator 18. Different APIs are generally written for different systems.

The third party needs to know the API for the initiator 18. The API is typically provided by the makers of the initiator 18 for the particular system. Third party remotes 20 utilized to manage initiators typically need to know how to communicate with the initiators. Consequently, the third party remote needs to know the API of the initiator 18 and the operating system. If code must be ported to the third party remote to test the API on the initiator 18, then this takes a large amount of time and effort.

Figure 1B:
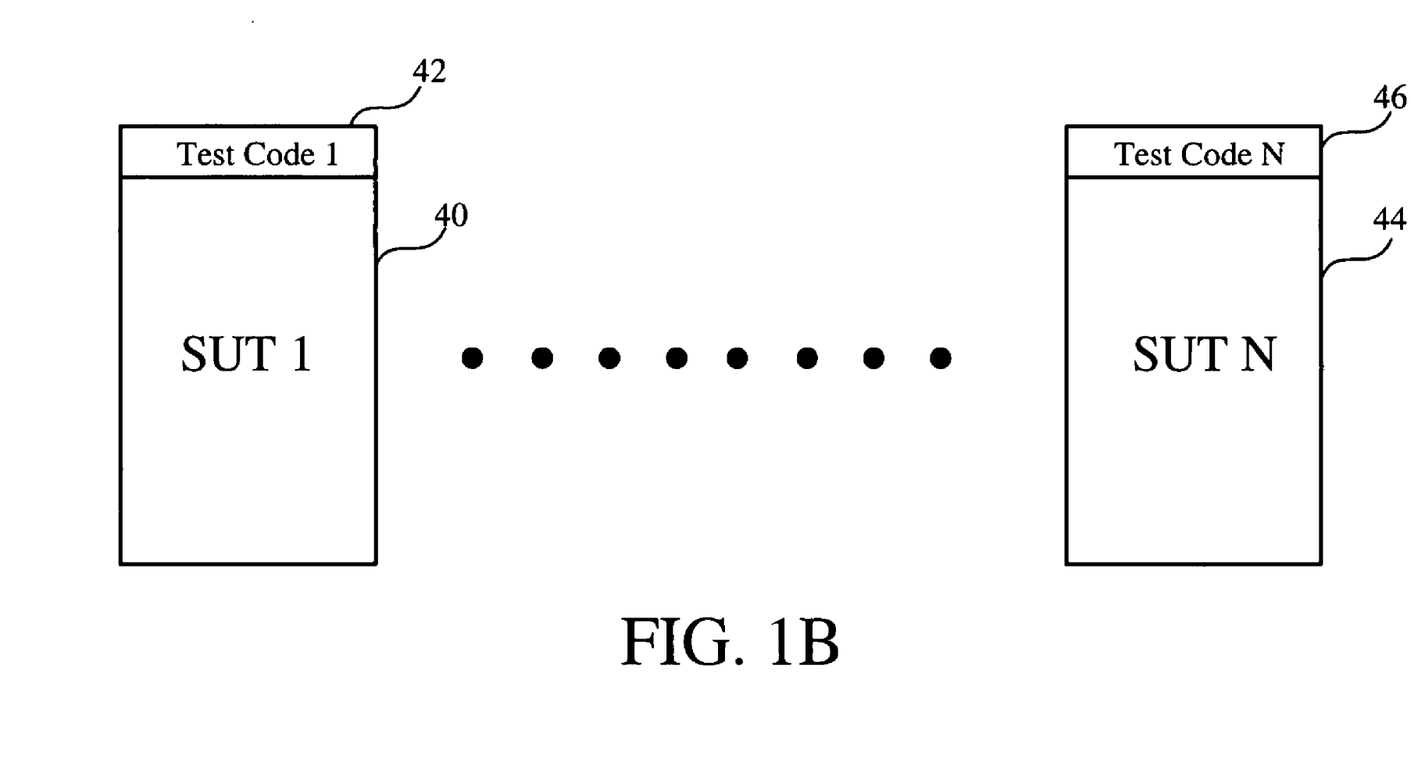
FIG. 1B illustrates typical systems under test.

FIG. 1B illustrates typical systems under test. In a typical system under test (SUT) such as SUT-1 40 through SUT-N 44, each of the systems under test have a test code such as test code-1 42 through test code-N 46. Generally each of the SUTs has a particular test code, which a user would have to install on the system. Consequently, API testing code typically must be ported to different systems to test whether each of the APIs are working. As a result, APIs must be manually ported and tested on the local machine. As the number of SUTs grows, the number of test codes grows. Therefore, to test each of the SUTs, extensive time is generally necessary to port new code to the new system.

Therefore, there is a need for an initiator-target system that enables centralized console API testing.

SUMMARY OF THE INVENTION

As can be seen, there is a need for a way for centralized console API testing by centralizing test development under one operating system. Several inventive embodiments of the present invention are described below.

In one embodiment, a method for API testing is provided that includes attaching a top level header to an API request from a console where the top level header facilitates processing of the API request by a host driver. The method also includes forwarding the API request with the top level header to the host driver and receiving an API response from the host driver where the API response includes the top level header. The method also includes removing the top level header from the API response so the console can process the API response.

In another embodiment, a method for API testing is provided which includes receiving an API request from an API console, and attaching a top level header to the API request where the top level header facilitates processing of the API request by a host driver. The method further includes forwarding the API request with the top level header to the host driver and receiving an API response from the host driver where the API response includes the top level header. The method further includes removing the top level header from the API response and sending the API response without the top level header to the API console.

In yet another embodiment, a computer readable media having program instructions for API testing is provided. The computer media includes program instructions for attaching a top level header to an API request from a console where the top level header facilitates processing of the API request by a host driver. The computer readable media also includes program instructions for forwarding the API request with the top level header to the host driver. The computer readable media further includes program instructions for receiving an API response from the host driver where the API response includes the top level header. The computer readable media also includes program instructions for removing the top level header from the API response so the console can process the API response.

The advantages of the present invention are numerous. Most notably, by creating a centralized console API testing architecture and methods for using the same, API testing may be done in an intelligently organized manner that takes less time than prior art methods. Because the API testing is centralized under one operating system, new code specific to each system does not have to be ported in thereby saving large amounts of time. Specifically, the use of an agent daemon that can act as a translation layer between the console and the system under test, creates a powerful system where large amounts of new code do not have be ported in for different systems. Consequently, the methodology and architecture described herein significantly increases API efficiency and decreases the time required for API testing.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a method and device for using a centralized console for API testing. It will be obvious, however, to one skilled in the art, that the present invention may be practiced without some or all of these specific details. In other instances, well known process operations have not been described in detail in order not to unnecessarily obscure the present invention.

Console based testing resolves the problems of the prior art by centralizing test development under one operating system. This minimizes the amount of code that needs to be ported whenever a new operating system needs to be supported. In one embodiment, test suites are developed under the Linux operating system on which the test console resides. It should be understood that other types of operating systems may be utilized. Therefore, the Linux operating system is discussed herein as one possible exemplary embodiment of many different embodiments that can utilize any suitable operation system such as, for example Windows NT, Windows 2000, Windows XP, Macintosh OS and Solaris.

As a result, test development may be centralized under one operating system by using the methodology described herein. The test console system can communicate with the system under test via a network connection. Communication may be accomplished using a custom protocol developed specifically for performing API testing. An API console module is used on a console system to forward requests and accept responses from an API agent daemon that resides on the system under test. The API agent acts as a conduit between the console system and the API interface for the system being tested. The porting effort to move the agent between operating systems should be relatively small due to the elegance of its design.

Moreover, API support covered by the API agent is not limited to only one technology. Separate modules can be added to support many areas of standard and storage networking. In one embodiment, the methodology as described herein may support SOCK-API, which are exported by TCP/IP off load engine (TOE), iSCSI Initiator API, iSCSI Target API, and SNIA iSCSI Management.

Figure 2:
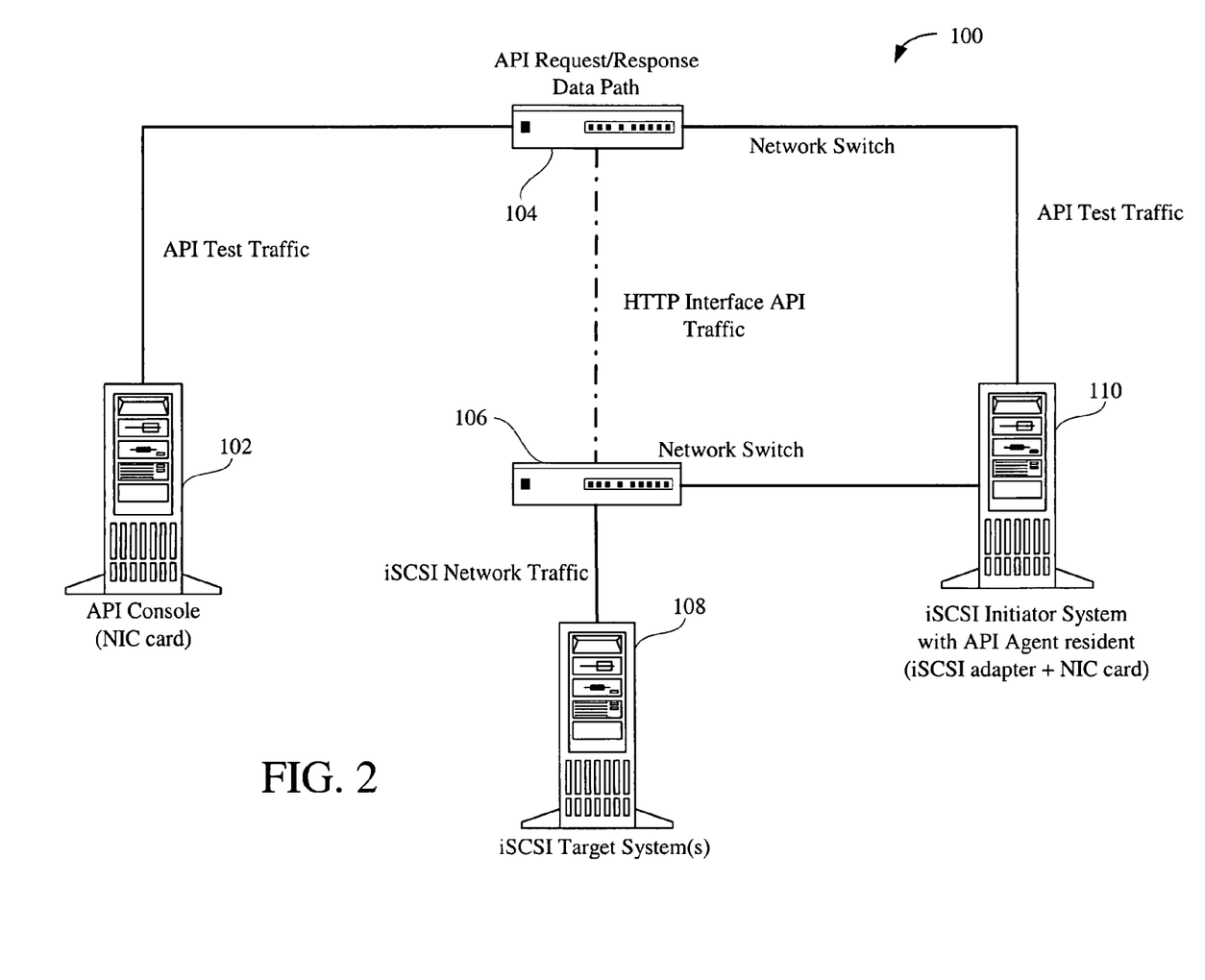
FIG. 2 illustrates a centralized console API test network configuration in accordance with one embodiment of the present invention.

FIG. 2 illustrates a centralized console API test network configuration 100 in accordance with one embodiment of the present invention. In one embodiment, an API validation test bed may include a system containing a unit under test such as an iSCSI initiator system 110 with the API_Agent resident. The iSCSI initiator system 110 can communicate with the API console 102 and an iSCSI target system through switches 104 and 106. API Network request/response traffic can flow between these systems either on the path used for API request/response data or the main path used for iSCSI communication between an initiator and targets. The path as depicted by the dotted line could be used for probing the HTTP interface of a target or an initiator. In one embodiment, two network switches are shown in the setup for clarity. However, it should be appreciated that only one switch is necessary in actual practice.

Figure 3:
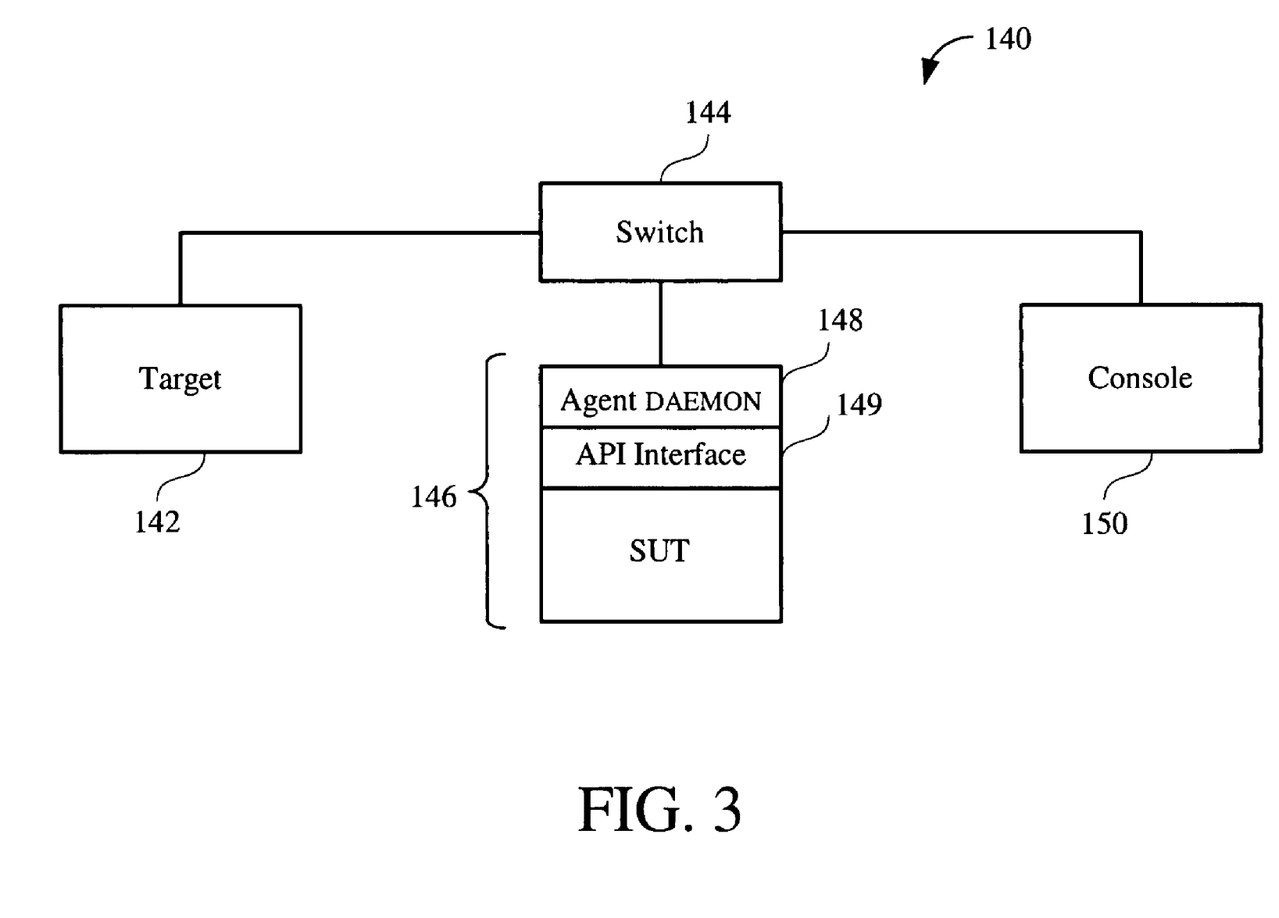
FIG. 3 illustrates a centralized console API test management system in accordance with one embodiment of the present invention.

FIG. 3 illustrates a centralized console API test management system 140 in accordance with one embodiment of the present invention. In one embodiment the system 140 includes a target 142, a system under test (SUT) 146, and a console 150. The SUT 146 includes an agent daemon 148, which facilitates communication with the switch 144 and an API interface 149. The API interface 149 communicates with a driver that can communicate with the firmware of the SUT 146. It should be appreciated that the console 150 may be any suitable type of console that may manage the SUT 146 such as, for example, a Linux console. The console 150 generates the API request. The console 150 has an API exercising application that exercises an API interface. The API interface exists on top of a driver that communicates with the firmware of the system under SUT 146. The agent daemon 148 receives the API request from the console 150 and then the agent daemon 148 interfaces between a driver (not shown) and the console 150.

Therefore, an API may be exercised without writing a specific API exercising application for each system being tested. The agent daemon 148 only needs to be installed on the SUT 146, which is capable of receiving the API exercising instructions from the console 150, and the agent daemon 148 translates the instructions from the console into a request that interfaces with the API interface of the SUT 146. The API interface then communicates with the firmware of the SUT 146. The agent daemon 148 is a translation layer that knows how to receive a request to exercise the API and knows the system it is sitting on so it knows the translation for the system under test and vice versa. In one embodiment, each OS has a specific agent daemon to be utilized.

In general terms, once the components of the system are connected, each agent daemon is loaded onto each initiator which then has its own specific agent daemon. The console is running its own management software. The console configures each of the initiators that are available. The configuring includes setting an IP address, setting a target name, and login negotiation parameters. For each request, the firmware of the SUT will respond with an error or success of configuring the IP address.

After the setup, the console 150 goes through pre-defined tests so one knows what is being tested and what data is expected to be returned from the testing. The SUT 146 is rescanned to determine how many targets exist and makes sure that the agent daemon 148 is translating properly. If the agent daemon 148 is not doing translation properly an error message will be shown on the console 150. Then, the console 150 communicates with and configures the target.

Figure 4:
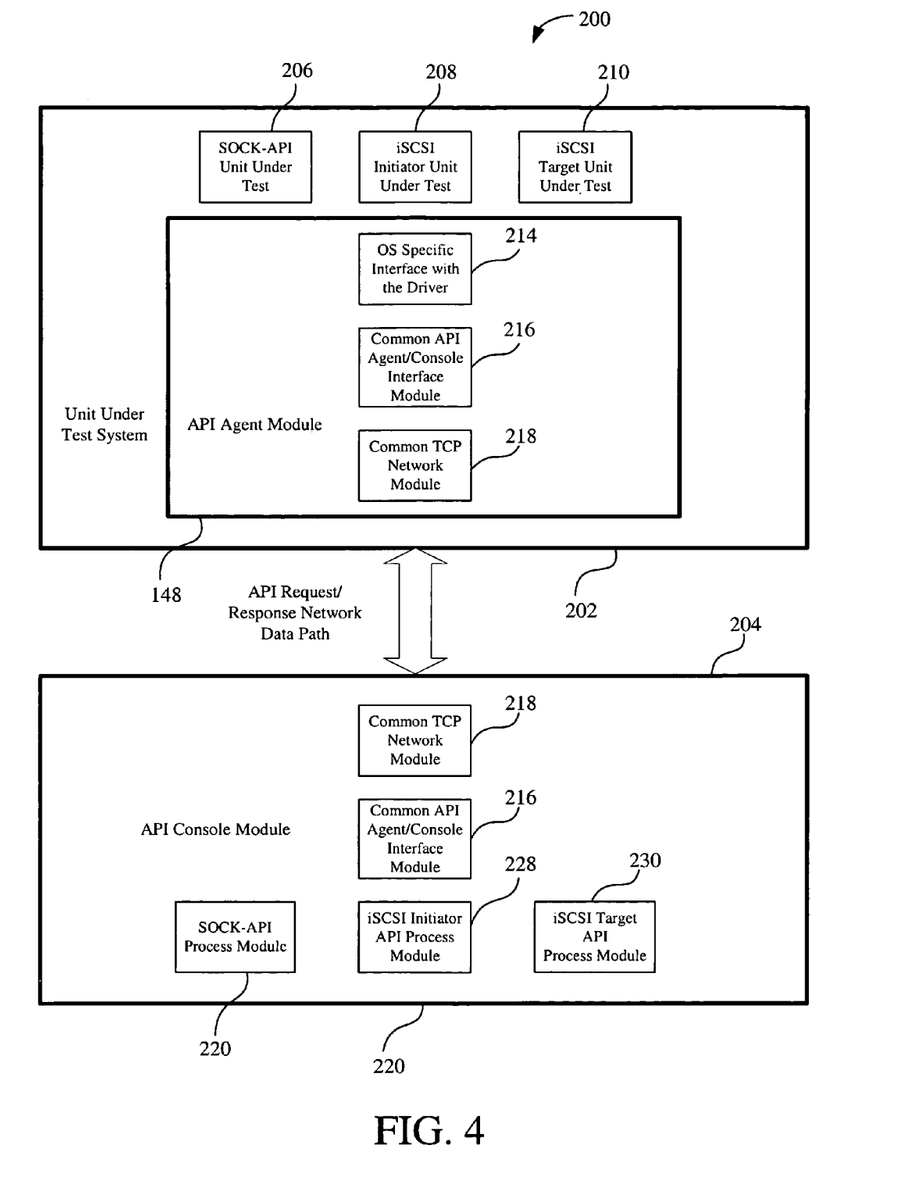
FIG. 4 shows an overview of a centralized console API testing architecture in accordance with one embodiment of the present invention.

FIG. 4 shows an overview of a centralized console API testing architecture 200 in accordance with one embodiment of the present invention. The API agent daemon 148 such as, for example, an API agent module, includes a common TCP network module 218, the common API agent/console interface module 216, and the operating system specific interface with the driver module (OSM) 214. The common TCP network module 218 handles opening and closing TCP connections and receiving and sending TCP packets. The common API agent/console interface module 216 processes the packets between the agent and the console. Upon receiving packets, it validates the parameters and strips out the agent/console header and forwards these packets to the operating system specific interface with the driver module (OSM) 214. When sending packets, it appends the agent/console header and forwards them to the common TCP module 218. The OSM Module 214 handles the interface between the operating system and the specific driver, which communicates with the firmware on the board. This module will forward these packets to the driver and finally to the firmware on board. The common TCP network module 218 handles opening and closing TCP connections and receiving and sending TCP packets. Different API agents can be developed for each product family linking the common modules with OSMs for different operating systems.

An API console includes a console module 220, which includes the common TCP network module 218, the common API agent/console interface module 216, and a specific API process module 228. Different API console modules can be developed for each technology using the common modules linked with the specific API process module. The common API agent/console interface module 216 processes the packets between the agent and the console. Upon receiving packets, it validates the parameters and strips out the agent/console header and forwards these packets to the operating system specific interface with the driver module (OSM) 214. When sending packets, it appends the agent/console header and forwards them to the common TCP module 218. Module iSCSI Initiator API Process Module 228 prepares the API Request and validates the API response for all parameters and data. Then it displays the summary results on the monitor and logs all the outputs to the specified output file for viewing later.

Figure 5:
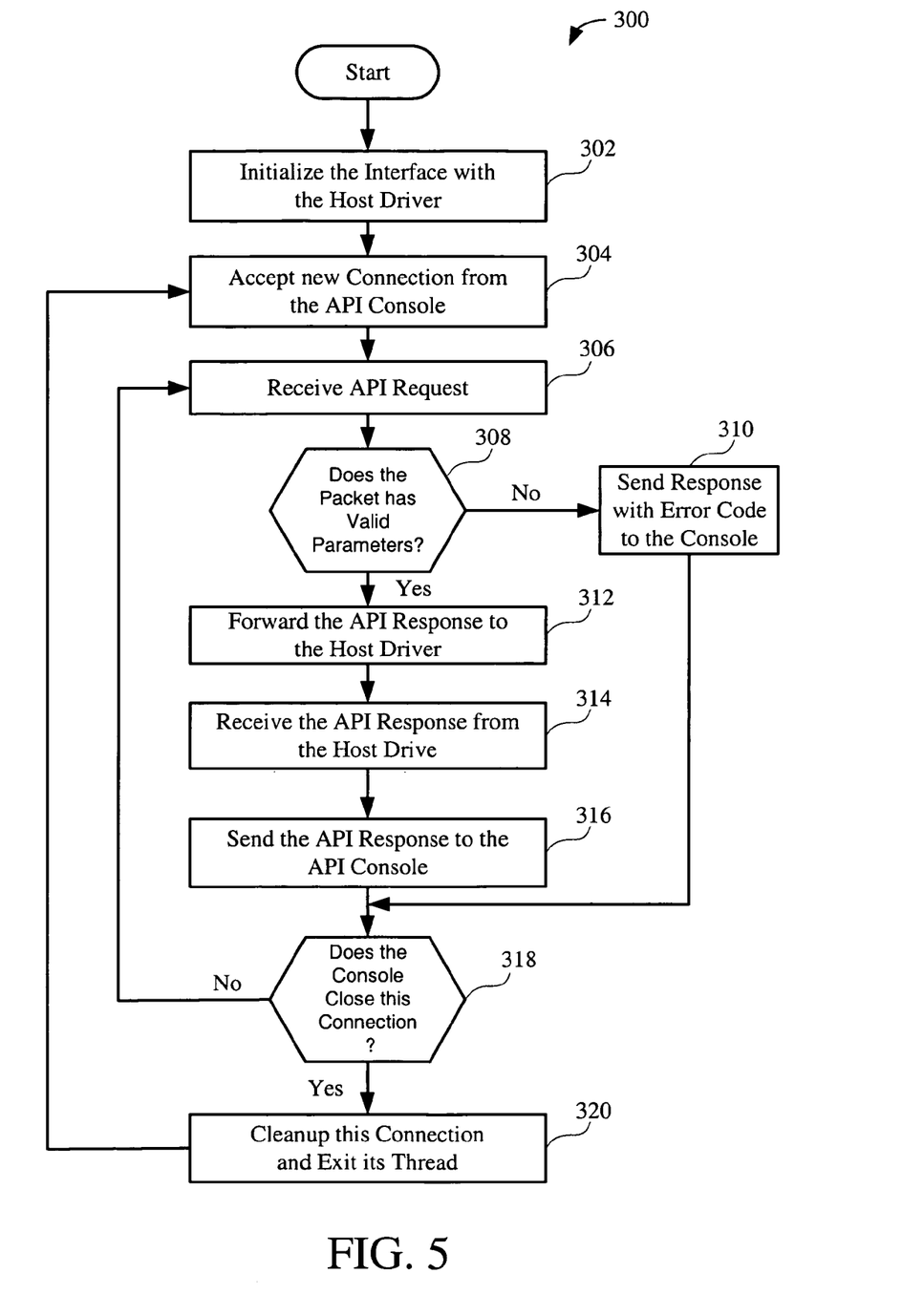
FIG. 5 shows a flowchart defining a method where an API agent enables communication between a console system and an API interface for the system being tested in accordance with one embodiment of the present invention.

FIG. 5 shows a flowchart 300 defining a method where an API agent enables communication between a console system and an API interface for the system being tested, in accordance with one embodiment of the present invention. The method begins with operation 302 where the agent initializes an interface with a host driver. The host needs to be initialized to accept the initial communication.

After operation 302, the method moves to operation 304, which accepts a connection from an API console. At this point, the agent is waiting for the communication from the API console to come through a port.

Then the method advances to operation 306 where an API request is received. After operation 306, the method proceeds to operation 308 where it is determined whether the packet has valid parameters. If the packet does not have valid parameters, the method advances to operation 310, which sends a response with an error code to a console. After operation 310, the method proceeds to operation 318, which determines whether the consol closes a connection.

Figure 7:
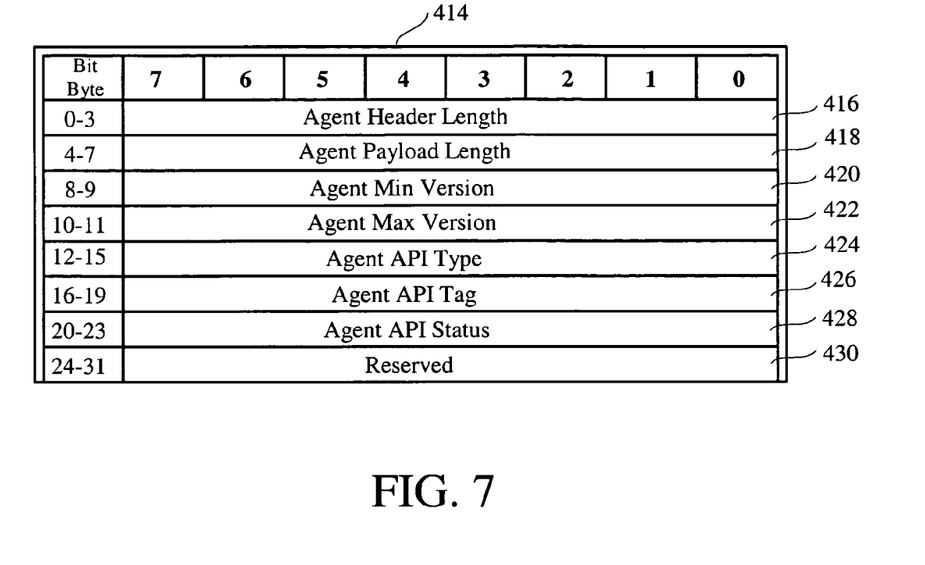
FIG. 7 illustrates an API agent header structure in accordance with one embodiment of the present invention.

If operation 308 determines that the packet has valid parameters, the method moves to operation 312 where the API request is forwarded to a host driver. The host driver is a driver for the firmware as discussed above. In one embodiment, a top level header as discussed below in reference to FIG. 7 is removed. The data portion below the top level header is sent to the driver. After operation 312, the method advances to operation 314, which receives an API response from the host driver. The agent daemon, in this operation, adds the top level header and communicates the packet back to the console. Then the method proceeds to operation 316 where the API response to the API console is sent. After operation 316, the method moves to operation 318.

If operation 318 determines that the console does not close the connection, the method returns to operation 304 and the method proceeds from operation 306 as discussed above. If operation 318 determines that the console closes the connection, the method advances to operation 320, which cleans up the connection and exits its thread. After operation 320, the method returns to operation 304 as discussed above. The methodology as discussed is exemplified in code previously incorporated by reference. It should be appreciated that the code is exemplary in nature and any other type of codification may be utilized as long as the operations as described herein may be accomplished.

Figure 6:
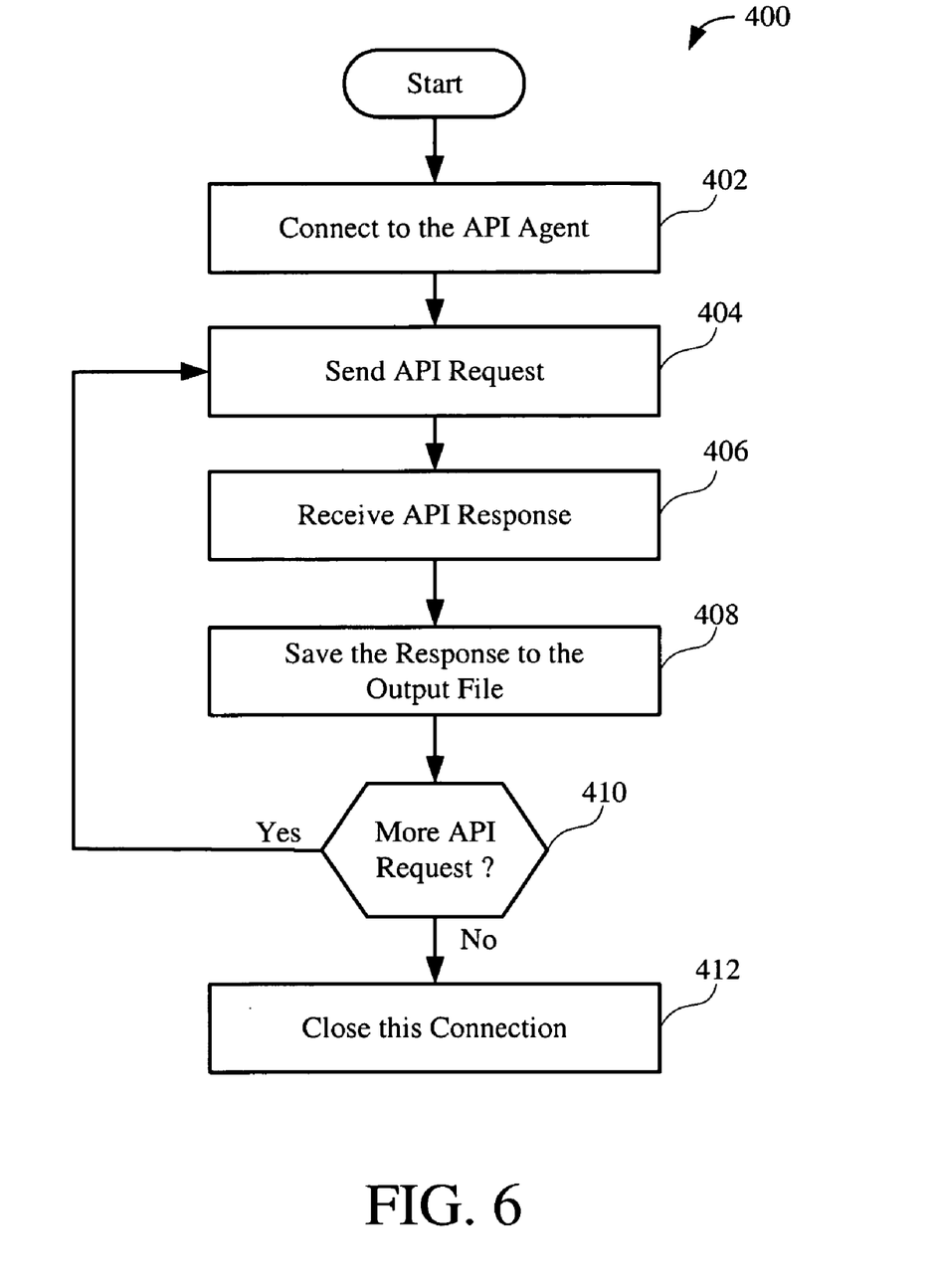
FIG. 6 shows a flowchart defining a method where an API console communicates with an API interface for the system being tested in accordance with one embodiment of the present invention.

FIG. 6 shows a flowchart 400 defining a method where an API console communicates with an API interface for the system being tested in accordance with one embodiment of the present invention. The method begins with operation 402, which connects to an API agent. After operation 402, the method advances to operation 404, which sends an API request to the agent. In this operation, the top level header is added and the packet is sent to the agent. Then the method moves to operation 406, which receives an API response. In this operation, the top level header is removed and the console can interpret what is has received back using one of its process modules as discussed above in reference to FIG. 4. After operation 408, the method proceeds to operation 410 where the method determines if there are more API requests. If the method determines that there is an additional API request, the method returns to operation 404 and repeats operations 404, 406, 408, and 410. If the method determines that there is no additional API request, the method moves to operation 412, which closes this connection.

FIG. 7 illustrates a API agent header structure 414 in accordance with one embodiment of the present invention. The structure 414 may be utilized for directing data packets to correct destinations and identifying the data packets. In one embodiment, the API console sends a request to the API agent consisting of the agent header and the API specific request data in the payload. The structure of the request contained in the payload will differ based on the API type being used (SOCK-API or iSCSI Initiator API, etc). The same header format is used for both the Request and Response packets. The structure 414 includes an agent header length field 416, an agent payload length field 418, an agent minimum version field 420, an agent maximum field 422, an agent API type field 424, an agent API tag field 426, an agent API status field 428, and a reserved filed 430.

The agent header length field 416 includes the total length of the agent header including this field. The agent payload length field 418 includes the total length of the API payload following the agent header. The agent minimum version field 420 includes the minimum version that the API agent module supports. The agent maximum version field 422 includes the maximum version that the API agent module supports. The agent API type field 424 includes the unique type of agent API. In one embodiment, the types of agent APIs include:

CONSOLE_INITIATOR_API_TYPE 0x01
CONSOLE_TARGET_API_TYPE 0x02
CONSOLE_SOCK_API_TYPE 0x03
CONSOLE_SNIA_ISCSI_API_TYPE 0x04 It should be appreciated that the agent APIs may be any suitable types of APIs that can be utilized with the methodology described herein. The agent API tag field 426 includes the unique tag of API console for each request. The agent API status field 428 includes the response status from the API agent, which may not be applicable if it is a request. The reserved field 430 can be utilized for future use.

In one embodiment, the API agent uses port 5002 to accept the TCP connections from the API Console. Further, the API agent initializes the TCP network server side to be ready to accept the client TCP connection via the above specified agent port. The API console may initialize the TCP network client side to open the TCP connection to the API agent. For each API request, the console can send a packet consisting of a header with a API agent header structure 414 with valid parameters and the specific API header, which is different for each type of API. Upon receiving this API request, the agent validates the API agent header parameters such as, for example, Min Version, Max Version, and size of the API agent header. In other exemplary embodiments, other API agent header parameters may be validated. If there are some parameter errors, the agent sends the response packet to the console consisting of only the API agent header with the appropriate status code. If there is no error in the API agent header, the agent makes an IOCTL call to the driver to send the specific API header request. When the driver returns the API response data, the agent sends back the response packet, which may include the API agent header with valid parameters and status code, and the specific API header response, which is different for each type of API.

In one embodiment, an iSCSI initiator agent will open the iSCSI initiator driver so that it can start the communication and initialize all structures, which will be used to interface with the driver. After it successfully makes a TCP connection to the agent, the iSCSI initiator console can send an API request to get the firmware version to check the compatibility between its API process module and the firmware. The iSCSI initiator console can also, after it successfully make a TCP connection to the Agent, validate if the initiator has an IP address or not. If not, it sends a request to configure an IP address. The iSCSI initiator can also validate if the initiator has a name or not. If not, it sends a request to configure an initiator name. The iSCSI initiator can also continue to send other API requests and process the corresponding responses.

In one embodiment, the iSCSI target agent will open the iSCSI target driver so that it can start the communication and initialize all structures, which will be used to interface with the driver. After the iSCSI target console successfully makes a TCP connection to the agent, it sends an API request to get the firmware version to check the compatibility between its API process module and the firmware. The iSCSI target console also validates if the target has an IP address or not. If not, it sends a request to configure an IP address. Further, the iSCSI target console continues to send other API requests and processes the corresponding responses.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter read by a computer system. Examples of the computer readable medium include read-only memory, random-access memory, CD-ROMs, CD-Rs, CD-RWs, magnetic tapes, and other optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for an application programming interface (API) testing, comprising:
   attaching a top level header to an API request from a console, the top level header facilitates processing of the API request by a host driver;
   forwarding the API request with the top level header to the host driver;
   receiving an API response from the host driver, the API response including the top level header; and
   removing the top level header from the API response so the console can process the API response.

2. A method for API testing as recited in claim 1, further comprising:
   receiving an API request from an API console before the top level header is attached.

3. A method for API testing as recited in claim 1, further comprising:
   sending the API response without the top level header to the API console after the top level header is removed from the API response.

4. A method for API testing as recited in claim 1, wherein forwarding the API request with top level header includes sending the API request to a driver of a system under test.

5. A method for API testing as recited in claim 1, wherein top level header is an agent header that includes an agent header length field, an agent payload length field, an agent minimum version field, and agent maximum field, an agent API type field, an agent API tag field, an agent API status field, and a reserved field.

6. A method for API testing as recited in claim 1, wherein the host driver is in communication with a firmware of a system under test.

7. A method for API testing as recited in claim 1, wherein the console is a Linux-type console.

8. A method for API testing as recited in claim 1, wherein the console connects to an agent daemon before the receiving of an API request from an API console occurs.

9. A method for API testing as recited in claim 8, wherein the agent daemon is an API agent.

10. A method for an application programming interface (API) testing comprising:
    receiving an API request from an API console;
    attaching a top level header to the API request, the top level header facilitates processing of the API request by a host driver;
    forwarding the API request with the top level header to the host driver;

receiving an API response from the host driver, the API response including the top level header;

removing the top level header from the API response; and sending the API response without the top level header to the API console.

11. A method for API testing as recited in claim 10, wherein forwarding the API request with top level header includes sending the API request to a driver of a system under test.

12. A method for API testing as recited in claim 10, wherein the top level header is an agent header that includes an agent header length field, an agent payload length field, an agent minimum version field, and agent maximum field, an agent API type field, an agent API tag field, an agent API status field, and a reserved field.

13. A method for API testing as recited in claim 10, wherein the host driver is in communication with a firmware of a system under test.

14. A method for API testing as recited in claim 10, wherein the console is a Linux-type console.

15. A method for API testing as recited in claim 10, wherein the console connects to an agent daemon before the receiving of an API request from an API console occurs.

16. A method for API testing as recited in claim 15, wherein the agent daemon is an API agent.

17. A computer readable media having program instructions for an application programming interface (API) testing, the computer readable media comprising:

program instructions for attaching a top level header to an API request from a console, the top level header facilitates processing of the API request by a host driver;

program instructions for forwarding the API request with the top level header to the host driver;

program instructions for receiving an API response from the host driver, the API response including the top level header; and program instructions for removing the top level header from the API response so the console can process the API response.

18. A computer readable media having program instructions for API testing as recited in claim 17, further comprising:

program instructions for receiving an API request from an API console before the top level header is attached.

19. A computer readable media having program instructions for API testing as recited in claim 17, further comprising:

program instructions sending the API response without the top level header to the API console after the top level header is removed from the API response.

20. A computer readable media having program instructions for API testing as recited in claim 17, wherein the top level header is an agent header that includes an agent header length field, an agent payload length field, an agent minimum version field, and agent maximum field, an agent API type field, an agent API tag field, an agent API status field, and a reserved field.

* * * * *